United States Patent
Yang et al.

(10) Patent No.: US 12,242,275 B2
(45) Date of Patent: Mar. 4, 2025

(54) AUTOMATIC GUIDED VEHICLE SYSTEM

(71) Applicants: Tyco Electronics (Shanghai) Co., Ltd., Shanghai (CN); TE Connectivity Services GmbH, Schaffhausen (CH)

(72) Inventors: An (Joshua) Yang, Shanghai (CN); Lvhai (Samuel) Hu, Shanghai (CN); Roberto Francisco-Yi Lu, Bellevue, WA (US)

(73) Assignees: Tyco Electronics (Shanghai) Co., Ltd., Shanghai (CN); TE Connectivity Solutions GmbH, Schaffhausen (CH)

( * ) Notice: Subject to any disclaimer, the term of this patent is extended or adjusted under 35 U.S.C. 154(b) by 212 days.

(21) Appl. No.: 17/955,928

(22) Filed: Sep. 29, 2022

(65) Prior Publication Data

US 2023/0094516 A1  Mar. 30, 2023

(30) Foreign Application Priority Data

Sep. 29, 2021 (CN) .......................... 202111155225.0

(51) Int. Cl.
*G05D 1/00* (2024.01)
*B65G 69/00* (2006.01)

(52) U.S. Cl.
CPC ......... *G05D 1/0225* (2013.01); *B65G 69/006* (2013.01); *B65G 69/003* (2013.01)

(58) Field of Classification Search
CPC ... G05D 1/0225; B65G 69/003; B65G 69/006
See application file for complete search history.

(56) References Cited

U.S. PATENT DOCUMENTS

| | | | |
|---|---|---|---|
| 5,995,884 A * | 11/1999 | Allen | G05D 1/0225 701/25 |
| 2019/0129399 A1* | 5/2019 | Wagner | G05D 1/0287 |
| 2022/0104674 A1* | 4/2022 | Xie | A47L 9/2805 |

FOREIGN PATENT DOCUMENTS

CN  110077491 A  *  8/2019

* cited by examiner

*Primary Examiner* — Aaron L Troost
(74) *Attorney, Agent, or Firm* — Barley Snyder

(57) ABSTRACT

An automatic guided vehicle system includes an automatic guided vehicle and a docking station for docking with the automatic guided vehicle. One of the automatic guided vehicle and the docking station has a pair of first vertical guide surfaces and the other has a pair of rows of rollers. The first vertical guide surfaces extend a predetermined length along a first horizontal direction and are spaced by a predetermined distance in a second horizontal direction perpendicular to the first horizontal direction. The rows of rollers are in rolling contact with the first vertical guide surfaces to guide the automatic guided vehicle to a predetermined position in the docking station.

21 Claims, 8 Drawing Sheets

AUTOMATIC GUIDED VEHICLE SYSTEM

CROSS-REFERENCE TO RELATED APPLICATION

This application claims the benefit of the filing date under 35 U.S.C. § 119(a)-(d) of Chinese Patent Application No. 202111155225.0, filed on Sep. 29, 2021.

FIELD OF THE INVENTION

The present invention relates to a vehicle system and, more particularly to an automatic guided vehicle system.

BACKGROUND

Automatic guided vehicle systems are important in logistics storage. Generally, the automatic guided vehicle system includes an automatic guided vehicle (AGV) and a docking station to be docked with the AGV. A laser radar navigation system is generally used to guide the automatic guided vehicle to move to a docking position in the docking station. However, the docking accuracy between the automatic guided vehicle and the docking station can only reach ±10 mm, which cannot meet the requirements of high-precision docking.

SUMMARY

An automatic guided vehicle system includes an automatic guided vehicle and a docking station for docking with the automatic guided vehicle. One of the automatic guided vehicle and the docking station has a pair of first vertical guide surfaces and the other has a pair of rows of rollers. The first vertical guide surfaces extend a predetermined length along a first horizontal direction and are spaced by a predetermined distance in a second horizontal direction perpendicular to the first horizontal direction. The rows of rollers are in rolling contact with the first vertical guide surfaces to guide the automatic guided vehicle to a predetermined position in the docking station.

BRIEF DESCRIPTION OF THE DRAWINGS

The features of the present invention will become more apparent by describing in detail exemplary embodiments thereof with reference to the accompanying drawings, in which.

DETAILED DESCRIPTION OF THE EMBODIMENTS

Figure 1:
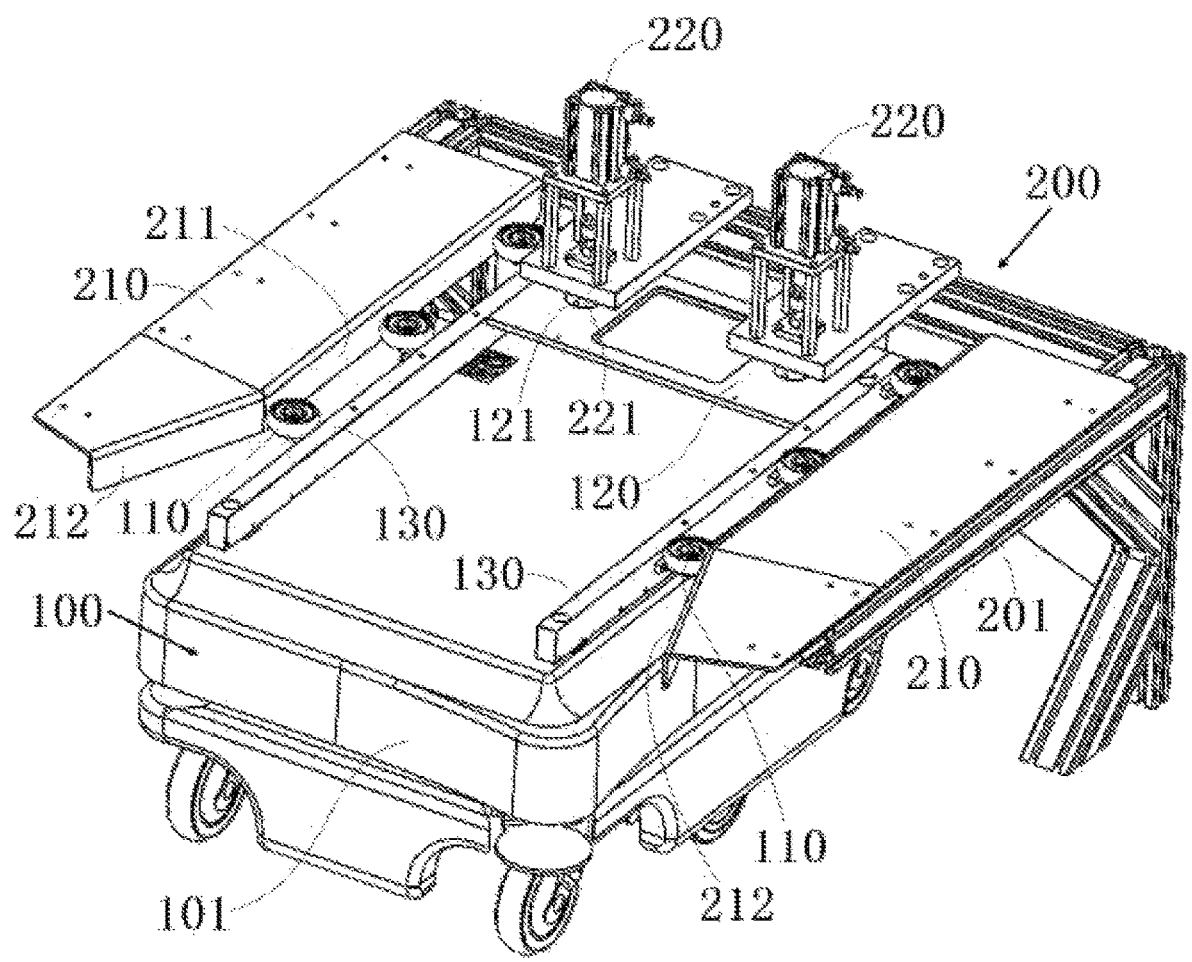
FIG. 1 is a perspective view of an automatic guided vehicle system according to an embodiment, with an automatic guided vehicle in a docking position with a docking station.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

As shown in FIG. 1, in the illustrated embodiment, an automatic guided vehicle system includes an automatic guided vehicle 100 and a docking station 200. The docking station 200 is used for docking with the automatic guided vehicle 100. A pair of first vertical guide surfaces 211 are arranged on one of the automatic guided vehicle 100 and the docking station 200, and two rows of rollers 110 are installed on the other. The automatic guided vehicle 100 is shown in a docking position docked with a docking station 200 in FIG. 1.

Figure 2:
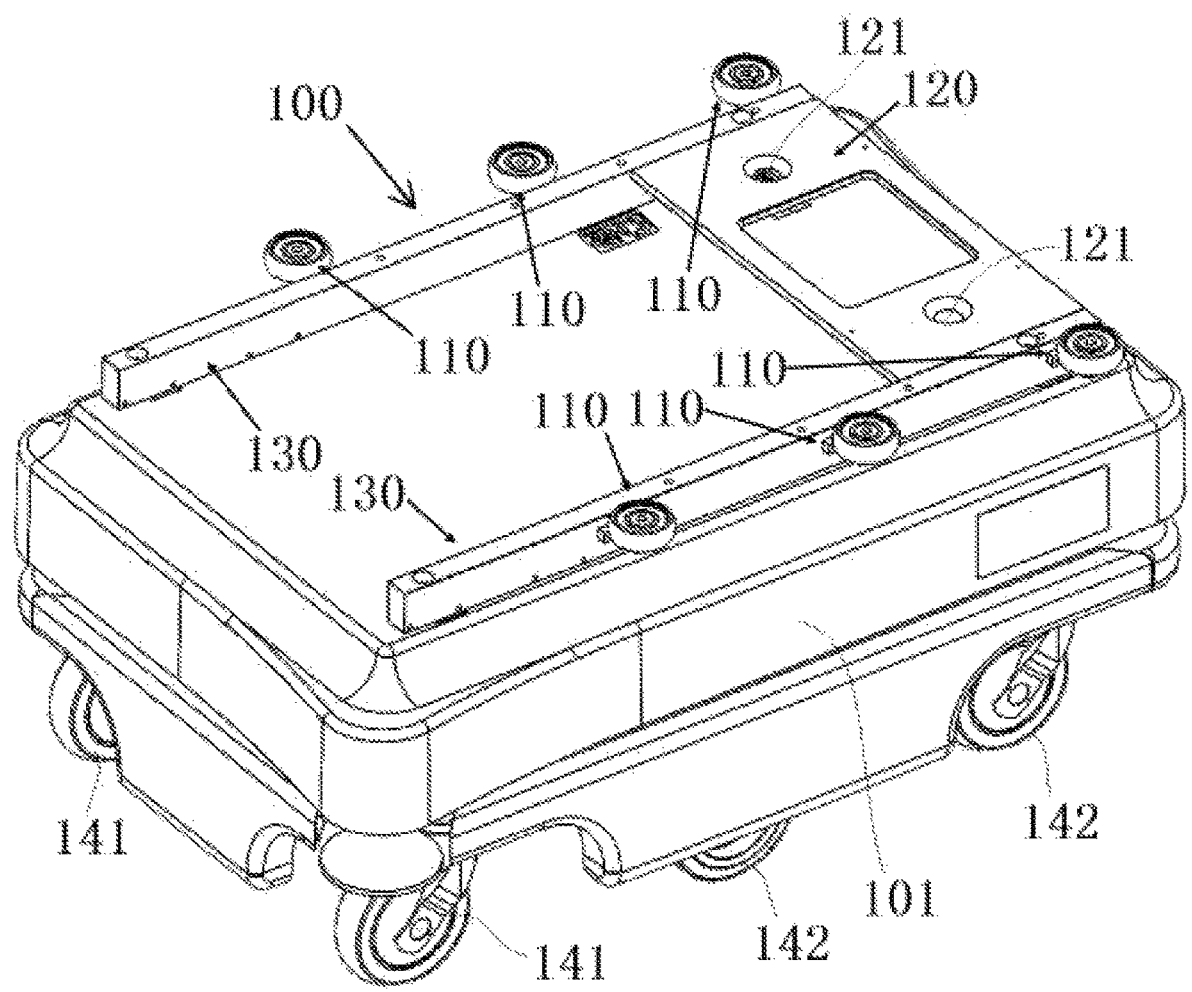
FIG. 2 is a perspective view of the automatic guided vehicle.
Figure 3:
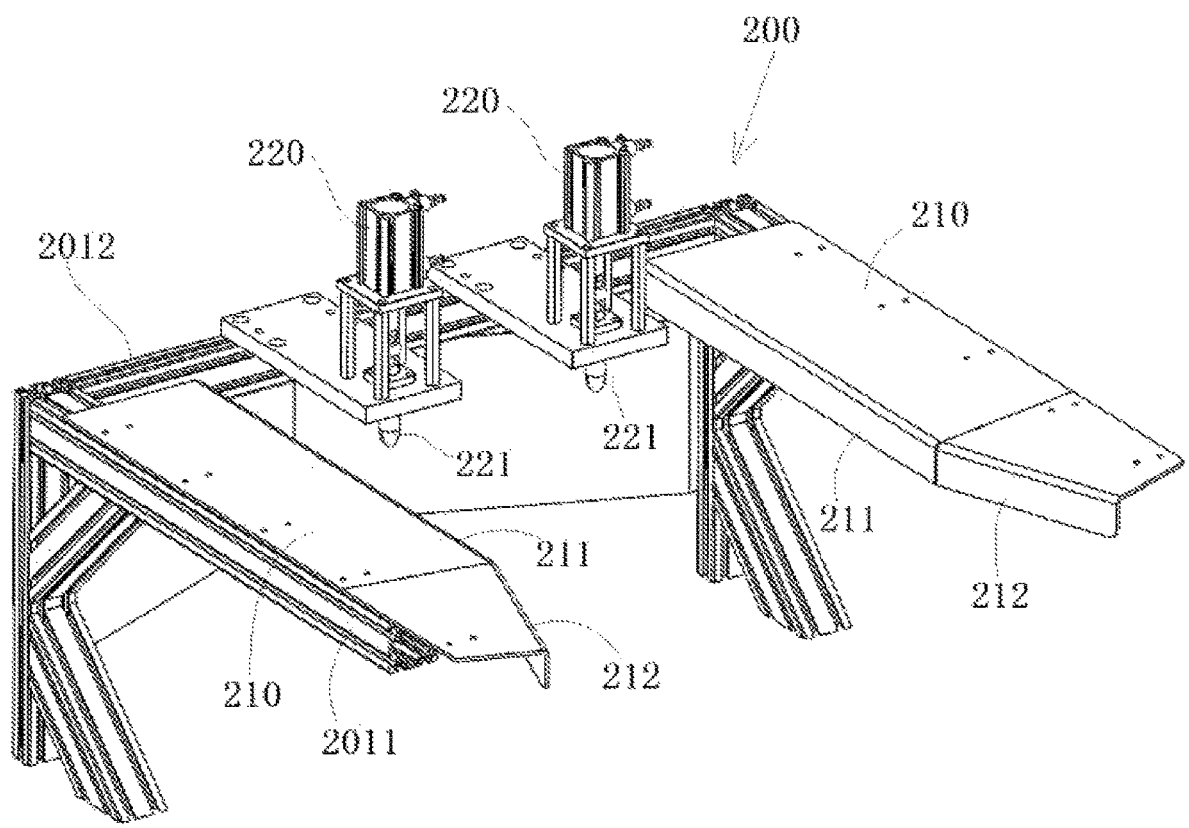
FIG. 3 is a perspective view of the docking station from an end.
Figure 4:
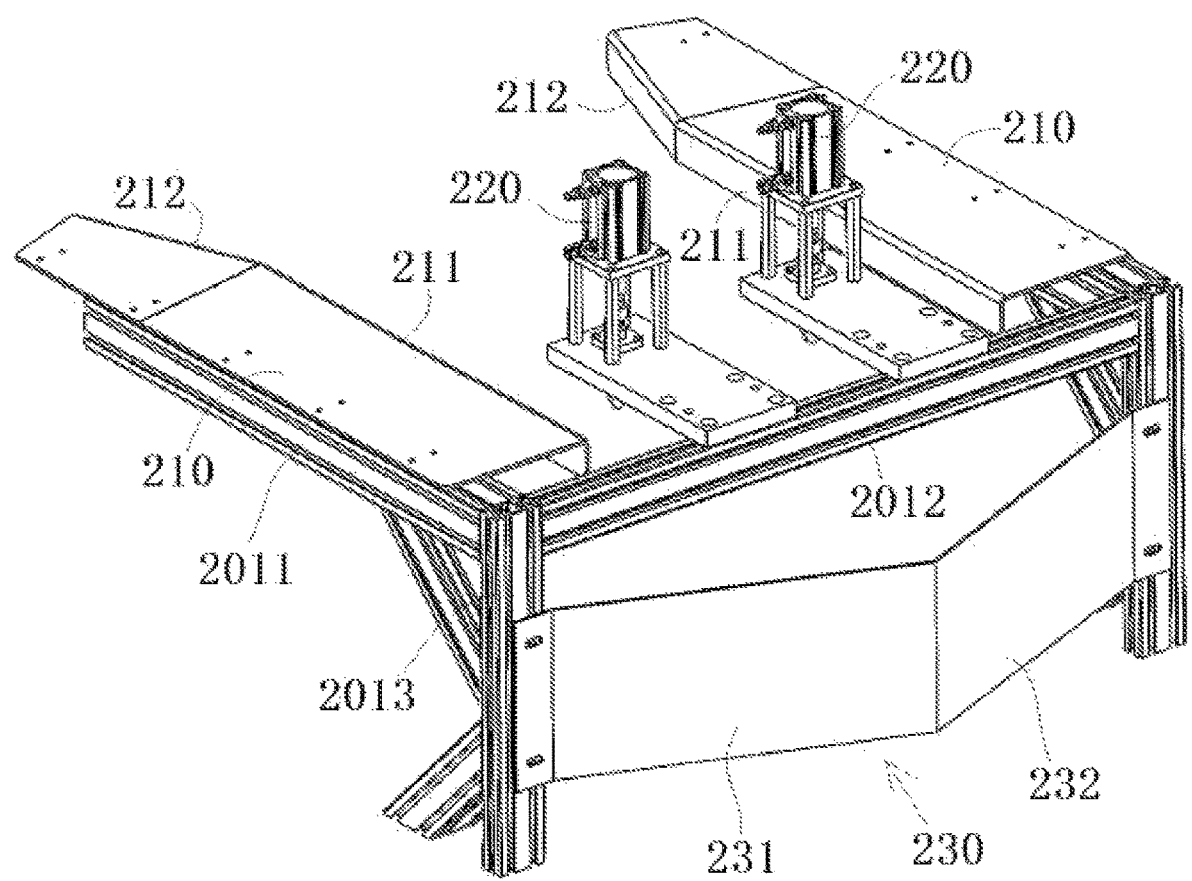
FIG. 4 is a perspective view of the docking station from another end.

FIG. 2 shows an illustrative perspective view of the automatic guided vehicle 100 of the automatic guided vehicle system shown in FIG. 1. FIG. 3 shows an illustrative perspective view of the docking station 200 of the automatic guided vehicle system shown in FIG. 1 when viewed from one end. FIG. 4 shows an illustrative perspective view of the docking station 200 of the automatic guided vehicle system shown in FIG. 1 when viewed from the other end.

As shown in FIGS. 1, 3, and 4, in the illustrated embodiment, a pair of first vertical guide surfaces 211 extend a predetermined length along the first horizontal direction and are spaced by a predetermined distance in a second horizontal direction perpendicular to the first horizontal direction. The two rows of rollers 110 are suitable for rolling contact with the pair of first vertical guide surfaces 211 respectively to guide the automatic guided vehicle 100 to the predetermined position in the docking station 200. That is, one row of rollers 110 is in rolling contact with one of the first vertical guide surfaces 211, and the other row of rollers 110 is in rolling contact with the other of the first vertical guide surfaces 211.

As shown in FIGS. 1 and 2, in the illustrated embodiment, when the automatic guided vehicle 100 is guided to the predetermined position in the docking station 200, the distance between the rotation axis of each roller 110 in each row of rollers 110 and the adjacent first vertical guide surface 211 is equal to the radius of the rollers 110. In the illustrated embodiment, the distance from the rotation axis of each roller in the row of rollers 110 on the left to the first vertical guide surface 211 on the left is equal to the radius of the rollers 110. The distance from the rotation axis of each roller in the row of rollers 110 on the right to the first vertical guide surface 211 on the right is equal to the radius of rollers 110.

As shown in FIG. 1, in the illustrated embodiment, when the automatic guided vehicle 100 is guided to the predetermined position in the docking station 200, the rotation axes of all rollers of any one row of rollers 110 are located in the same vertical plane parallel to the first vertical guide surface 211.

As shown in FIG. 1, in the illustrated embodiment, the pair of first vertical guide surfaces 211 are at the same height position, and the two rows of rollers 110 are also at the same height position.

As shown in FIGS. 1 and 2, in the illustrated embodiment, the automatic guided vehicle 100 includes a vehicle body 101 and two rows of rollers 110. The two rows of rollers 110 are installed on the vehicle body 101.

As shown in FIGS. 1, 3, and 4, in the illustrated embodiment, the docking station 200 includes: a frame 201 and a pair of guide plates 210 mounted on the frame 201. The pair of first vertical guide surfaces 211 are respectively formed on a pair of guide plates 210. A pair of second vertical guide surfaces 212 is also formed on the pair of guide plates 210. The pair of second vertical guide surfaces 212 form a flared entrance opening outward to guide two rows of rollers 110 into the space between the pair of first vertical guide surfaces 211. The second vertical guide surface 212 extends outward from one end of the first vertical guide surface 211 in a third horizontal direction inclined by a predetermined angle with respect to the first horizontal direction.

As shown in FIG. 2, a pair of strip plates 130 is arranged on the top surface of the vehicle body 101, and the section of the strip plate 130 is rectangular and extends along the first horizontal direction. The strip plate 130 has an outer side parallel to the first vertical guide surface 211, and two rows of rollers 110 are installed on the outer sides of the pair of strip plates 130 respectively.

Figure 5:
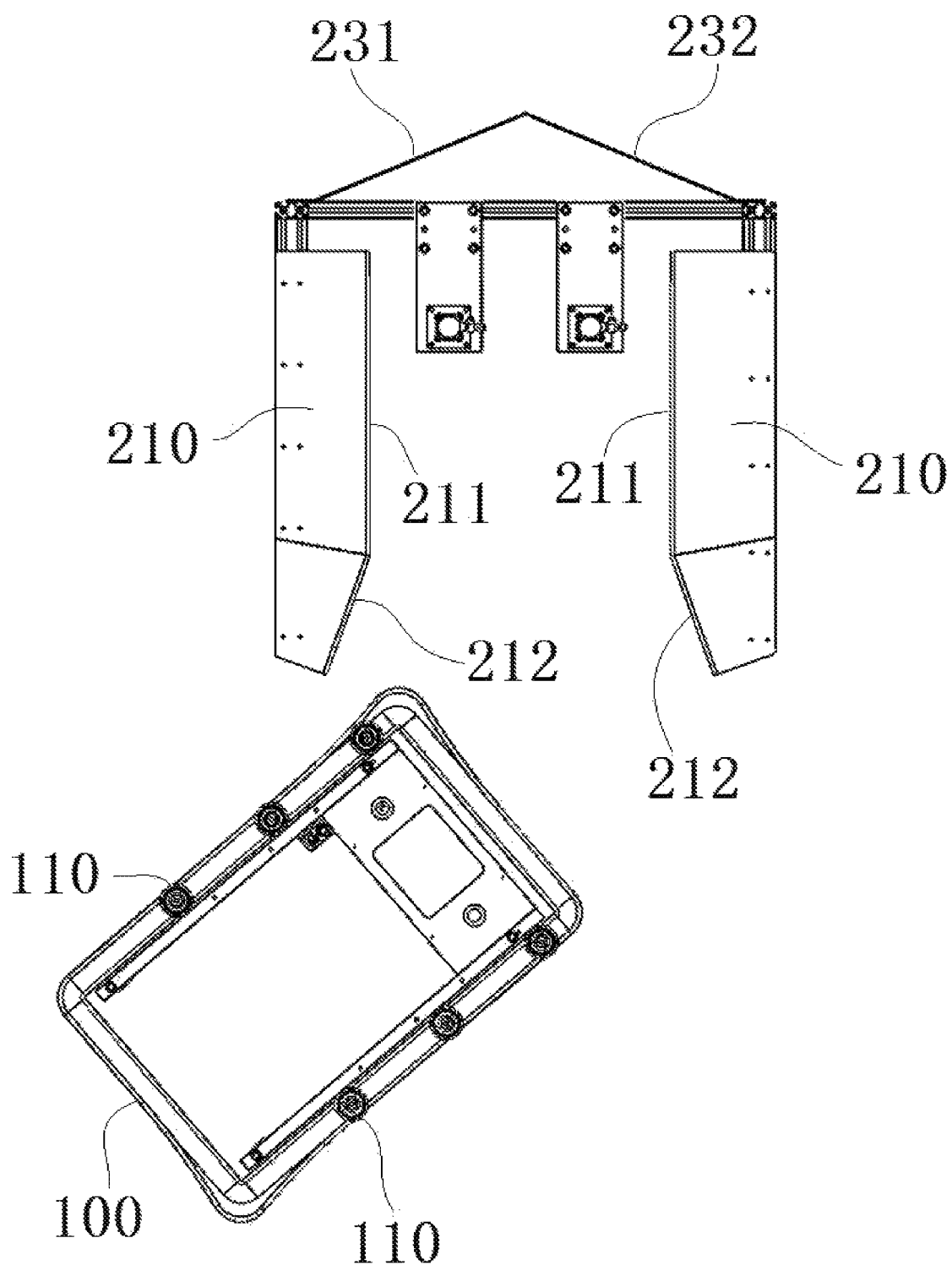
FIG. 5 is a top view of the automatic guided vehicle moving toward the docking station.
Figure 6:
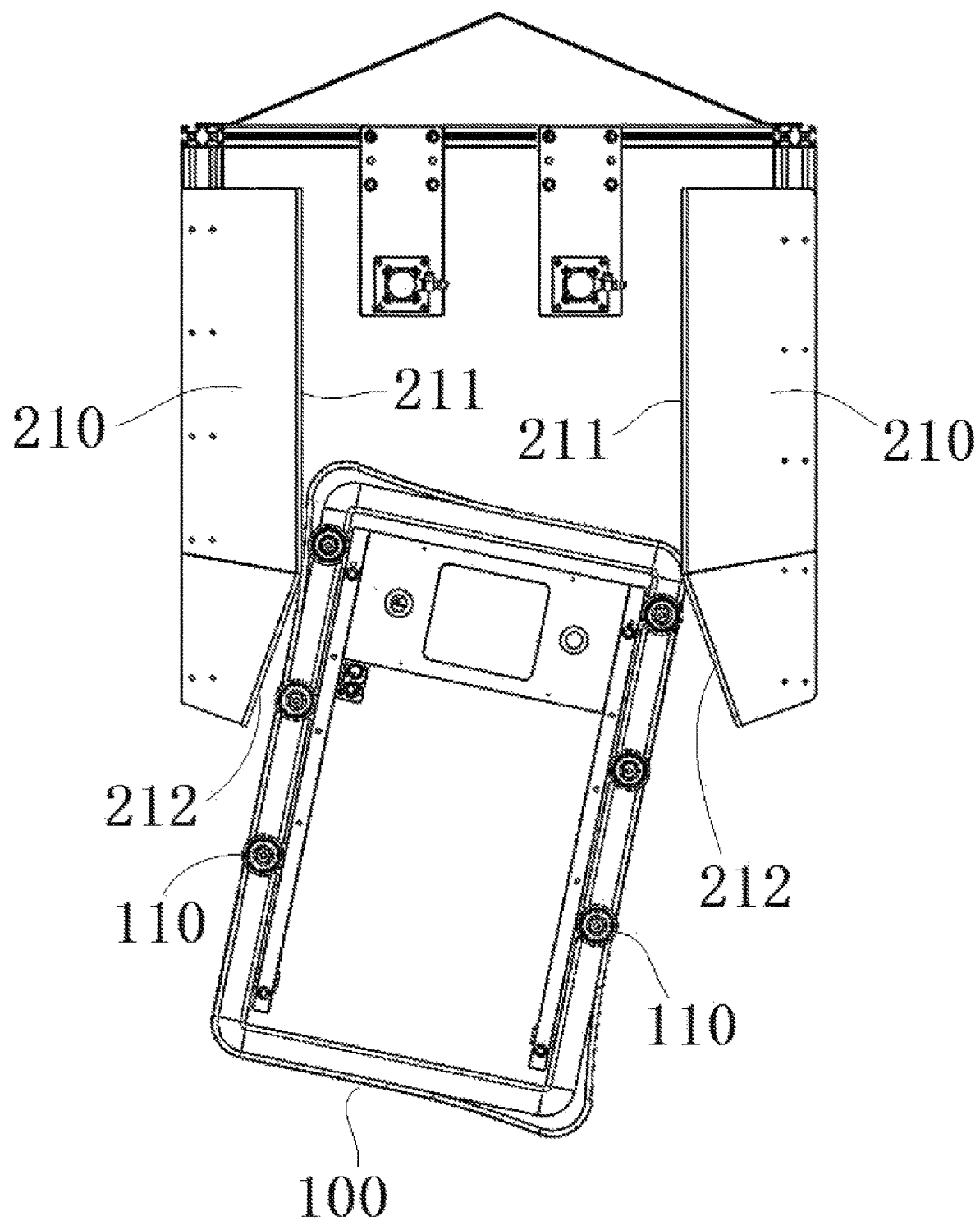
FIG. 6 is a top view of the automatic guided vehicle moving to an entrance of the docking station.
Figure 7:
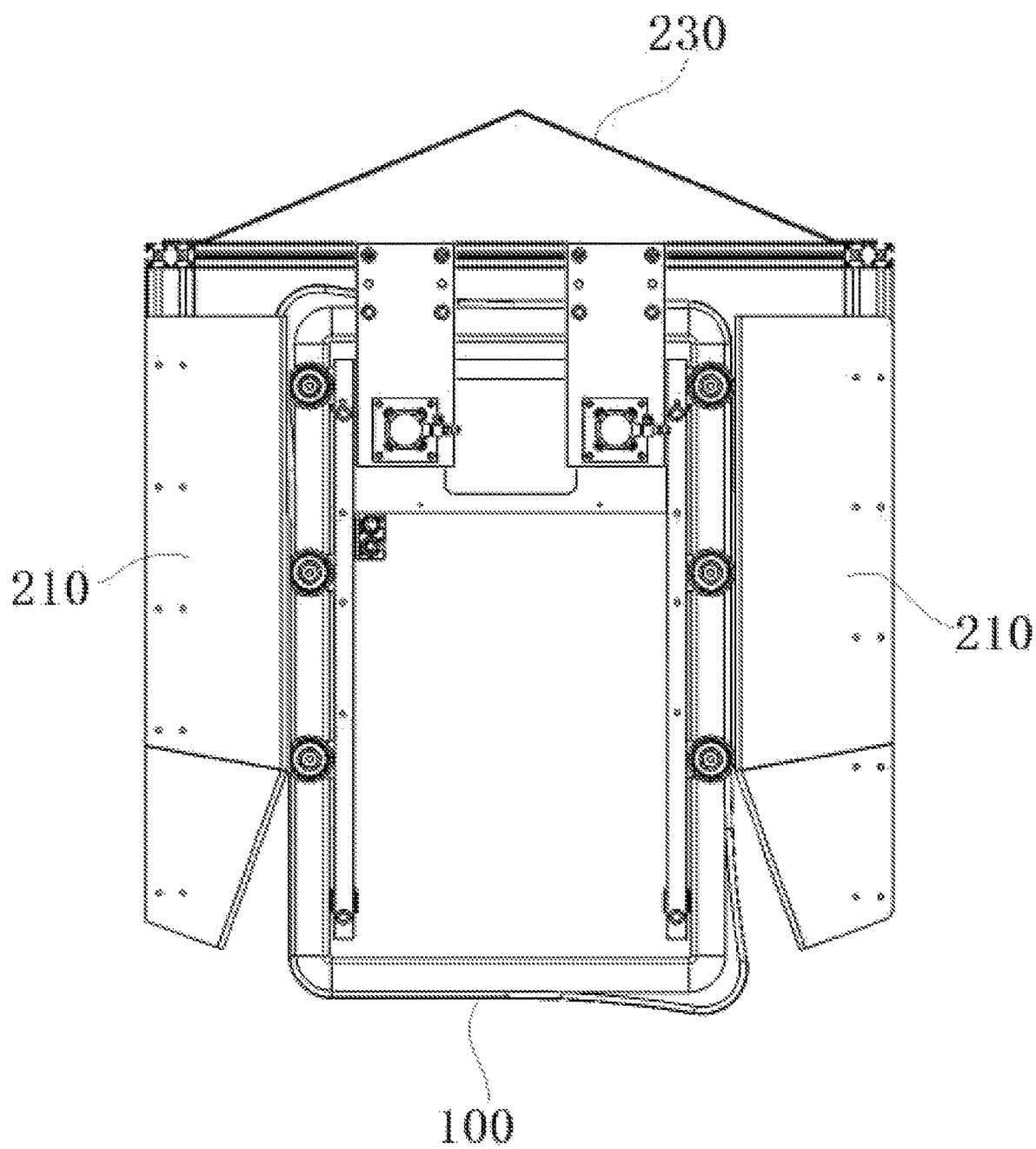
FIG. 7 is a top view of the automatic guided vehicle docking with the docking station.
Figure 8:
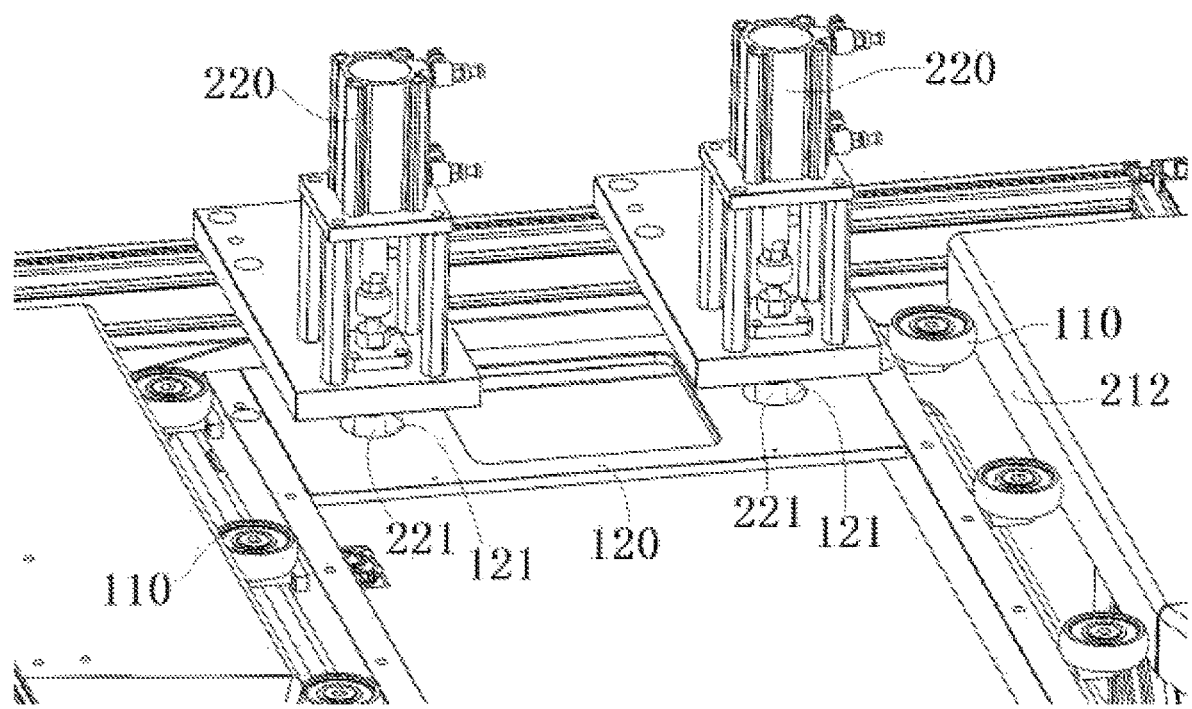
FIG. 8 is a perspective view of automatic guided vehicle and the docking station in the docking position.

FIG. 5 shows an illustrative view of the automatic guided vehicle 100 moving towards the docking station 200. FIG. 6 shows the automatic guided vehicle 100 moving to the entrance of the docking station 200. FIG. 7 shows the automatic guided vehicle 100 moving to the docking position for docking with the docking station 200. FIG. 8 shows a partially enlarged schematic diagram of the automatic guided vehicle 100 and the docking station 200 in the docking position shown in FIG. 7.

As shown in FIG. 4, the docking station 200 further comprises a vertically arranged V-shaped panel 230, which is mounted on the frame 201 and includes an obliquely intersecting first panel 231 and a second panel 232. The automatic guided vehicle 100 further comprises a sensor and a navigation system. The sensor is adapted to detect a first distance from the sensor to the first panel 231 and a second distance from the sensor to the second panel 232. The navigation system guides the automatic guided vehicle 100 to move to the predetermined position according to the detected first distance and the detected second distance. In an example, the sensor can be lidar.

As shown in FIG. 3, the frame 201 includes: a pair of horizontal beams 2011, a transverse beam 2012, and a pair of vertical beams 2013. The pair of horizontal beams 2011 extends along the first horizontal direction. The transverse beam 2012 is connected between ends of a pair of horizontal beams 2011. The pair of vertical beams 2013, shown in FIG. 4, are respectively connected to ends of the pair of horizontal beams 2011.

As shown in FIG. 4, in the illustrated embodiment, the ends of the first panel 231 and the second panel 232 are respectively connected to the pair of vertical beams 2013 of the frame 201. The pair of guide plates 210 are respectively installed on the pair of horizontal beams 2011 of the frame 201.

As shown in FIG. 2, at least one pair of steering wheels 141 and at least one pair of driving wheels 142 are installed on the chassis of the automatic guided vehicle 100, so that the automatic guided vehicle 100 can move freely on the ground.

As shown in FIGS. 2 and 8, a plurality of positioning holes 121 are arranged on one of the automatic guided vehicle 100 and the docking station 200, and a plurality of positioning pins 221 suitable for matching with the plurality of positioning holes 121 are arranged on the other. When the automatic guided vehicle 100 is guided to the predetermined position in the docking station 200, the plurality of positioning pins 221 are inserted into the plurality of positioning holes 121 respectively to position the automatic guided vehicle 100 at the predetermined position.

As shown in FIG. 8, in the illustrated embodiment, the central axis of the positioning hole 121 and the positioning pin 221 extends in the vertical direction, and the positioning pin 221 is inserted into the positioning hole 121 in the vertical direction. The opening of the positioning hole 121 is flared outward and/or the top of the positioning pin 221 is tapered to guide the positioning pin 221 to be inserted into the positioning hole 121.

As shown in FIGS. 1 and 2, a positioning plate 120 is installed on the top surface of the vehicle body 101 of the automatic guided vehicle 100, and a plurality of positioning holes 121 are formed on the positioning plate 120. A plurality of cylinders 220 are installed on the top of the frame 201 of the docking station 200, and the plurality of positioning pins 221 are respectively connected to the piston rods of the plurality of cylinders 220; The cylinder 220 is used to drive the positioning pin 221 to be inserted into or pulled out of the positioning hole 121.

In the above exemplary embodiments of the present invention, the automatic guided vehicle 100 can be accurately guided to the predetermined position in the docking station 200 through the guidance of the first vertical guide surfaces 211, which improves the docking accuracy between the automatic guided vehicle 100 and the docking station 200, and generally improves the docking accuracy to ±3 mm.

In the above-mentioned exemplary embodiments of the present invention, through the coordination of the positioning pin 221 and the positioning hole 121, the automatic guided vehicle 100 is accurately positioned at the predetermined position in the docking station 200, further improving the docking accuracy between the automatic guided vehicle 100 and the docking station 200, and generally improving the docking accuracy to ±0.5 mm.

It should be appreciated for those skilled in this art that the above embodiments are intended to be illustrative, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. An automatic guided vehicle system, comprising:
an automatic guided vehicle; and
a docking station for docking with the automatic guided vehicle, the docking station includes a frame, and a V-shaped panel arranged vertically and installed on the frame, the V-shaped panel having a first panel and a second panel which intersect obliquely, one of the automatic guided vehicle and the docking station has a pair of first vertical guide surfaces and the other has a pair of rows of rollers, the first vertical guide surfaces extend a predetermined length along a first horizontal direction and are spaced by a predetermined distance in a second horizontal direction perpendicular to the first horizontal direction, the rows of rollers are in rolling contact with the first vertical guide surfaces to guide the automatic guided vehicle to a predetermined position in the docking station.

2. The automatic guided vehicle system according to claim 1, wherein, when the automatic guided vehicle is guided to the predetermined position in the docking station, a distance between a rotation axis of each roller in each row of rollers and an adjacent first vertical guide surface of the first vertical guide surfaces is equal to a radius of the roller.

3. The automatic guided vehicle system according to claim 1, wherein, when the automatic guided vehicle is guided to the predetermined position in the docking station, a plurality of rotation axes of each row of rollers in the rows of rollers are located in a same vertical plane parallel to the first vertical guide surfaces.

4. The automatic guided vehicle system according to claim 1, wherein the first vertical guide surfaces and the rows of rollers are at a same height position in a vertical direction.

5. The automatic guided vehicle system according to claim 1, wherein the automatic guided vehicle includes a vehicle body and the rows of rollers installed on the vehicle body.

6. The automatic guided vehicle system according to claim 5, wherein the docking station includes a pair of guide plates installed on the frame, the pair of first vertical guide surfaces are formed on the pair of guide plates.

7. The automatic guided vehicle system according to claim 6, wherein a pair of second vertical guide surfaces are formed on the pair of guide plates, the pair of second vertical guide surfaces form a flared entrance to guide the rows of rollers into a space between the pair of first vertical guide surfaces.

8. The automatic guided vehicle system according to claim 7, wherein the second vertical guide surfaces extend outward from one end of the first vertical guide surfaces in a third horizontal direction inclined by a predetermined angle with respect to the first horizontal direction.

9. The automatic guided vehicle system according to claim 5, wherein a pair of strip plates are arranged on a top surface of the vehicle body, a section of each strip plate is rectangular and extends along the first horizontal direction, each strip plate has an outer side parallel to the first vertical guide surfaces, the rows of rollers are respectively installed on the outer sides of the pair of strip plates.

10. The automatic guided vehicle system according to claim 6, wherein the automatic guided vehicle includes:
a sensor detecting a first distance from the sensor to the first panel and a second distance from the sensor to the second panel; and
a navigation system guiding the automatic guided vehicle to move to the predetermined position according to the first distance and the second distance.

11. The automatic guided vehicle system according to claim 10, wherein the frame includes:
a pair of horizontal beams extending along the first horizontal direction;
a transverse beam connected between ends of the horizontal beams; and
a pair of vertical beams respectively connected to the ends of the horizontal beams.

12. The automatic guided vehicle system according to claim 11, wherein the ends of the first panel and the second panel are respectively connected to the pair of vertical beams of the frame, the pair of guide plates are installed on the pair of horizontal beams of the frame.

13. The automatic guided vehicle system according to claim 1, wherein at least one pair of steering wheels and at least one pair of driving wheels are installed on a chassis of the automatic guided vehicle.

14. The automatic guided vehicle system according to claim 1, wherein a plurality of positioning holes are provided on one of the automatic guided vehicle and the docking station, and a plurality of positioning pins suitable for matching with the plurality of positioning holes are provided on the other of the automatic guided vehicle and the docking station.

15. The automatic guided vehicle system according to claim 14, wherein, when the automatic guided vehicle is guided to the predetermined position in the docking station, the plurality of positioning pins are respectively inserted into the plurality of positioning holes to position the automatic guided vehicle at the predetermined position.

16. The automatic guided vehicle system according to claim 15, wherein a central axis of the positioning hole and the positioning pin extends along a vertical direction, and the positioning pin is inserted into the positioning hole along the vertical direction.

17. The automatic guided vehicle system according to claim 15, wherein an opening of each of the positioning holes is flared outward and/or a top of each of the positioning pins is tapered to guide the positioning pins into the positioning holes.

18. The automatic guided vehicle system according to claim 15, wherein a positioning plate is installed on a top surface of a vehicle body of the automatic guided vehicle, the plurality of positioning holes are formed on the positioning plate, a plurality of cylinders are installed on a top of a frame of the docking station, the plurality of positioning pins are respectively connected to a plurality of piston rods of the plurality of cylinders.

19. The automatic guided vehicle system according to claim 18, wherein the cylinders drive the positioning pins to be inserted into or to be pulled out of the positioning holes.

20. An automatic guided vehicle system, comprising:
an automatic guided vehicle; and
a docking station for docking with the automatic guided vehicle, one of the automatic guided vehicle and the docking station has a pair of first vertical guide surfaces and the other has a pair of rows of rollers, the first vertical guide surfaces extend a predetermined length along a first horizontal direction and are spaced by a predetermined distance in a second horizontal direction perpendicular to the first horizontal direction, the rows of rollers are in rolling contact with the first vertical guide surfaces to guide the automatic guided vehicle to a predetermined position in the docking station, wherein:
- a positioning plate is installed on a top surface of a vehicle body of the automatic guided vehicle, a plurality of positioning holes are formed in the positioning plate;
- a plurality of cylinders are installed on a top of a frame of the docking station, a plurality of positioning pins are respectively connected to a plurality of piston rods of the plurality of cylinders; and
- when the automatic guided vehicle is guided to the predetermined position in the docking station, the plurality of positioning pins are respectively inserted into the plurality of positioning holes to position the automatic guided vehicle at the predetermined position.

21. An automatic guided vehicle system, comprising:
an automatic guided vehicle including a positioning plate having a plurality of positioning holes formed therein; and
a docking station for docking with the automatic guided vehicle, the docking station including a frame and at least one cylinder installed on the frame, a plurality of positioning pins connected to at least one piston rod of the at least one cylinder, wherein one of the automatic guided vehicle and the docking station has a pair of first vertical guide surfaces and the other has a pair of rows of rollers, the first vertical guide surfaces extend a predetermined length along a first horizontal direction and are spaced by a predetermined distance in a second horizontal direction perpendicular to the first horizontal direction, the rows of rollers are in rolling contact with the first vertical guide surfaces to guide the automatic guided vehicle to a predetermined position in the docking station, when the automatic guided vehicle is guided to the predetermined position in the docking station, the plurality of positioning pins are respectively inserted into the plurality of positioning holes to position the automatic guided vehicle at the predetermined position.

* * * * *